United States Patent [19]

Engler et al.

[11] Patent Number: 5,043,311

[45] Date of Patent: Aug. 27, 1991

[54] MONOLITHIC OR HONEYCOMB-TYPE CATALYST

[75] Inventors: Bernd Engler, Hanau; Edgar Koberstein, Alzenau; Egbert Lox, Hanau; Herbert Voelker, Zeiskam, all of Fed. Rep. of Germany

[73] Assignee: Degussa Aktiengesellschaft, Frankfurt am Main, Fed. Rep. of Germany

[21] Appl. No.: 510,266

[22] Filed: Apr. 19, 1990

[30] Foreign Application Priority Data

Apr. 20, 1989 [DE] Fed. Rep. of Germany ....... 3912915

[51] Int. Cl.$^5$ .............................................. B01J 32/00
[52] U.S. Cl. .................................. 502/439; 423/213.5
[58] Field of Search ..................... 423/213.5; 502/439, 502/527

[56] References Cited

U.S. PATENT DOCUMENTS

| 3,791,143 | 2/1974 | Keith et al. | 423/213.2 X |
|---|---|---|---|
| 3,869,410 | 3/1975 | Bunda et al. | 502/439 |
| 3,901,821 | 8/1975 | Retallick | 502/527 X |
| 3,904,551 | 9/1975 | Lundsager et al. | 423/213.5 X |
| 4,153,579 | 5/1979 | Summers et al. | 423/213.5 X |
| 4,318,888 | 3/1982 | Chapman et al. | 423/213.5 X |
| 4,340,505 | 7/1982 | Dolan | 502/333 X |
| 4,455,336 | 7/1984 | Ogawa et al. | 502/527 X |
| 4,740,408 | 4/1988 | Mochida et al. | 502/527 X |
| 4,857,413 | 8/1989 | Hashimoto et al. | 502/527 X |
| 4,931,419 | 6/1990 | Blanchard et al. | 423/213.5 X |

*Primary Examiner*—W. J. Shine
*Assistant Examiner*—Douglas J. McGinty
*Attorney, Agent, or Firm*—Beveridge, DeGrandi & Weilacher

[57] ABSTRACT

A monolithic or honeycomb-catalyst, in particular for purifying the exhaust gases of internal-combustion engines, composed of an inert ceramic or metallic support traversed by parallel flow channels, a layer disposed thereon and composed of catalysis-promoting metal oxide and a catalytically active component supported by the metal oxide, wherein the concentration of the catalysis-promoting metal oxide increases from the periphery to the central axis of the support. Alternatively, the catalysis-promoting metal oxide is essentially equally distributed between central axis and periphery of the support, but concentration of catalytically active component increases from the central axis to the periphery of the support.

3 Claims, 2 Drawing Sheets

MONOLITHIC OR HONEYCOMB-TYPE CATALYST

INTRODUCTION AND BACKGROUND

The present invention relates to a monolithic or honey-comb type catalyst, in particular for purifying the exhaust gases of internal-combustion engines, composed of an inert ceramic or metallic substrate traversed by parallel flow channels, a support layer disposed thereon and composed of catalysis-promoting metal oxide and a catalytically active component supported by the metal oxide layer. The catalyst of the invention has improved start-up behavior.

An important characteristic of catalysts of the monolithic or honeycomb type is the speed with which the catalyst reaches the working temperature when exposed to a hot gas to be treated. The use of such catalysts as chemical catalysts or exhaust gas purifying catalysts, for example for industrial exhaust gases or engine exhaust gases, can be simplified substantially by improving this characteristic.

Hitherto an attempt has been made to achieve this by a more or less expensive increase in the amount of catalytically active material or by thermal insulation measures with respect to the catalyst unit.

SUMMARY OF THE INVENTION

The present invention has as an object to provide a new way of solving the problems known in the prior art.

In achieving the above and other objects, a feature of the invention relates to a monolithic or honeycomb-type catalyst, in particular for purifying the exhaust gases of internal-combustion engines, composed of an inert ceramic or metallic substrate carrier traversed by a multiplicity of parallel flow channels formed therein, a catalyst support layer disposed thereon and composed of catalysis-promoting metal oxide and a catalytically active component supported by the metal oxide layer. The composite catalyst of this invention has as an important feature the fact that the concentration of the catalysis-promoting metal oxide increases from the periphery to the central axis of the support.

The concentration distribution according to the invention of the catalysis-promoting metal oxide support layer, for example composed of $\gamma$-$Al_2O_3$, $CeO_2$, $TiO_2$, $SiO_2$ and the like, which is usually applied by the known suspension coating method, achieves, in particular, an equalization of the natural velocity profile for gases flowing through monoliths or honeycombs, and even, indeed, empty tubes. The consequence is a more uniform distribution of the gas flow in the catalyst unit and consequently a more equalized development of heat when exothermic reactions set in and proceed in the course of operation of the catalyst in its installation.

According to a very effective embodiment, the distribution according to the invention of the metal oxide serving as support material for the catalytically active component can be increased still further by an additional provision wherein the concentration of the catalytically active component increases from the central axis to the periphery of the substrate carrier.

This preferred variant can also be modified according to a further independent embodiment of the invention wherein the catalysis-promoting metal oxide support material remains essentially equally distributed between the central axis and periphery of the inert substrate carrier and only the concentration of the catalytically active component increases from the central axis to the periphery of the inert substrate carrier. This monolithic or honeycomb-type catalyst, which is simplified compared with the main product of the invention as previously described above, can be used, for example, in those cases in which the inflow paths leading to the catalyst have the same cross section as the monolith or the honeycomb. That is to say, in this embodiment a more uniform exposure to gas of the inflow surfaces is present from the outset.

In general, a noble metal concentration which increases from the central axis to the periphery counteracts a reduction in the conversion in the outwardly situated monolith or honeycomb regions as a consequence of cooling of the pollutant converter containing the monolith or honeycomb due to the air stream.

The concentration profile which is to be applied according to the invention to the metal oxide support coating and/or the loading with the catalytically active component should be of stepwise or continuous design. This can be accomplished, for example, in a stepwise manner by keeping an end face of the carrier free of the respective deposit during the coating or loading, which takes place in a plurality of steps. A mask, for example in the form of a disk or a ring, can be used for this purpose which covers the center or the edge region. Then by loading the area remaining free in accordance with the desired concentration one or more times with the substance to be applied, the desired effect can be obtained.

A continuous loading with oxide coating can be achieved by a segment arrangement which continuously opens or closes after the fashion of a photographic diaphragm shutter, the latter being opened or closed with variable velocity in accordance with the dwell time necessary for a desired local loading.

A continuous loading with the catalytically active component may, however, also be achieved by operating an application nozzle, which rotates on a spiral track around the central axis of the monolith or the honeycomb and which can scan a plurality of channels simultaneously. The velocity of movement is chosen to be that which is necessary to achieve a desired local loading. The supply pipe or the supply nozzle may also be connected to a rotating disk valve in the form of a slotted plate with a slot continuously variable in length, which plate rotates above an end face of the monolith or the honeycomb.

In connection with the application of the masks mentioned, the local concentration of the loading can be influenced by means of the flow velocity of a loading liquid, the loading increasing in general when the flow velocity through the channels of the monolith or the honeycomb is increased.

BRIEF DESCRIPTION OF THE DRAWINGS

The invention will be further understood with reference to the drawings herein.

DETAILED EMBODIMENT OF INVENTION

Figure 1:
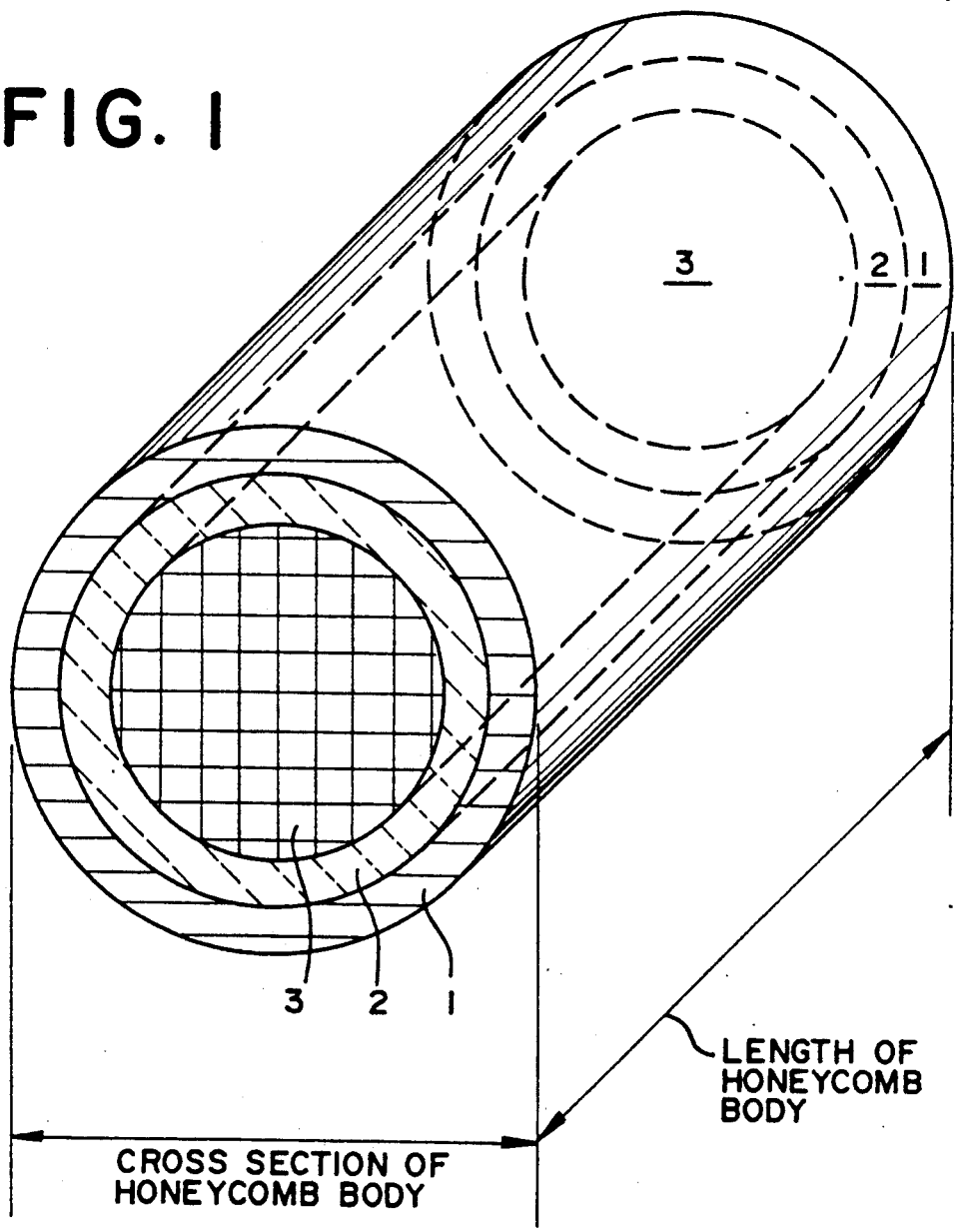
FIG. 1 is a schematic perspective view of a carrier with concentric zones.

The present invention is explained in more detail below with reference to exemplary embodiments in conjunction with a simple experimental arrangement and a diagrammatic drawing comprising FIG. 1 and FIG. 2.

EXAMPLE 1

Four automobile exhaust gas catalysts (designated as catalyst A, B, C and D) were produced which had a honeycomb body made of cordierite having 400 cells/inch$^2$, diameter 4.66 inch, length 6 inch and wall thickness 6 mil.

The catalysts were produced in four consecutive steps:

First step: preparation of the coating suspension;
Second step: applying the coating suspension on the honeycomb;
Third step: applying the precious metals on the honeycomb coated with the suspension;
Fourth step: reduction of the noble metals in hydrogen.

The first step, the production of a support coating suspension containing catalysis-promoting metal oxide doped with promoters was identical for all four catalysts and comprised the dispersing of high-purity gamma-aluminum oxide powder having a specific surface of 180 m$^2$/g in water. Cerium carbonate and zirconium carbonate were then added consecutively to this aluminum oxide dispersion while stirring vigorously, so that 60 parts by weight of $CeO_2$ and 3 parts by weight of $ZrO_2$ were present for 100 parts by weight of $Al_2O_3$.

The second step, the coating of the honeycomb body with the dispersion as prepared above was carried out in the case of catalyst A, the comparison catalyst, by slowly immersing the honeycomb body in the dispersion, slowly withdrawing it, blowing the honeycomb body channels free by means of air and then blow-drying the honeycomb body thus coated with air for 10 minutes at a temperature of 120° C.

This operation was repeated three times. Then air was passed through the honeycomb body coated with the doped $Al_2O_3$ support layer for 2 hours at 600° C. in order to convert the cerium carbonate and zirconium carbonate into the corresponding oxides.

For the catalysts B and C, the honeycomb bodies were coated with the dispersion in three immersion operations.

After the first immersion operation with subsequent blowing free of the honeycomb body channels with air and drying for 10 minutes in air at 120° C., three concentric zones with identical surface areas were marked on both end faces of the honeycomb bodies, as shown in FIG. 1. Thus, the outer zone of the monolith is shown by reference number 1, the intermediate zone of the monolith is shown by reference number 2 and the inner zone of the monolith is shown by reference number 3.

Before the second immersion operation, zone 1 was taped off on both end faces with adhesive tape. After the second immersion operation with subsequent blowing free of the channels with air and drying for 10 minutes in air at 120° C., zone 2 was now also taped off on both end faces with adhesive tape. Then the third immersion operation was carried out, followed by blowing free of the channels and drying in air.

The adhesive tape was then removed and air at 600° C. was passed through the honeycomb body for 2 hours in order to convert the cerium carbonate and zirconium carbonate into the corresponding oxides. The honeycomb body coated in this way contained 60 grams of coating per liter of honeycomb body volume grams in zone 1, 100 in zone 2 and 200 grams in zone 3.

In total the honeycomb body contained 120 grams of oxide coating per liter of honeycomb body volume in accordance with the calculation:

$$\frac{60 \text{ (gas/liter)} \times V_1 \text{ (liter)} + 100 \text{ (gas/liter)} \times V_2 \text{ (liter)} + 200 \text{ (gas/liter)} \times V_3 \text{ (liter)}}{V_1 (l) + V_2 (l) + V_3 (l)} = 120 \text{ g/l}$$

wherein $V_1$, $V_2$ and $V_3$ represent the volume of zone 1, zone 2 and zone 3, respectively. In the present cases, $V_1$, $V_2$ and $V_3$ were equal to one-third of the honeycomb body volume.

As a result of this production procedure, compared with the comparison catalyst A, more oxide coating is present in the center of the honeycomb bodies (zone 3) and less washcoat is present at the outer edge of the honeycomb bodies (zone 1). Consequently, the areas with through flow are smaller in the center of the honeycomb bodies (zone 3) and larger at the edge (zone 1) compared with the comparison catalyst A, and this produces, as the final effect, a more homogeneous flow distribution of the exhaust gases in the catalysts B and C.

In the case of the catalyst D according to the invention, the oxide coating was applied as in the case of catalyst A.

The third step, which was directed to produce an automobile exhaust gas catalyst, related to the application of the noble metal.

For the four catalysts A, B, C and D. an aqueous solution of $H_2PtCl_6$ and $RhCl_3$ was used for this purpose. The total amount of noble metal on the four catalysts corresponds to 0.714 grams per liter of honeycomb body volume in a quantitative ratio by weight of Pt:Rh=5:1.

For catalyst A, the comparison catalyst, the noble metal was applied by immersing the honeycomb body coated with the oxide coating once in the aqueous noble metal solution, then drying for 4 hours in air at 250° C. and calcining for 2 hours at 600° C. in air. Catalyst A contained the noble metals homogeneously distributed both over the cross section of the honeycomb body and also over the length of the honeycomb body.

Catalyst B contained the noble metals homogeneously distributed over the cross section of the honeycomb body. This was achieved by applying the entire amount of noble metal corresponding to catalyst A in three steps. In the first step, zones 2 and 3 were taped off on both end faces; the so taped off monolithic was dipped into a solution which contained one-third of the desired noble metal amount. In the second step, the zones 1 and 2; the so taped off monolithic was dipped into a solution which contained the second-third of the desire noble metal amount. In the third step, zones 1 and 3 were taped off in both end faces; the so taped off monolithic was dipped into a solution which contained the last third of the desired noble metal amount, were taped off on both end faces. After the immersion operations, drying was carried out in air at 250° C. for 4 hours and calcining was then carried out in air at 600° C. for 2 hours.

Catalyst C contained the noble metal heterogeneously distributed over the cross section of the honeycomb body, so that more noble metal was present at its edge (zone 1) than in its center (zone 3). In order to achieve this, the noble metal impregnation was carried out in three steps.

In the first immersion step, the honeycomb body was immersed in the aqueous solution of the noble metal salts without any further measures. Before the second step, zone 3 was taped off on both end faces of the honeycomb body, and before the third immersion step, both zone 2 and also zone 3 were taped off on both end faces of the honeycomb body.

After these three immersion steps, drying was carried out in air at 250° C. for 4 hours and then calcining was carried out in the air at 600° C. for 2 hours.

In zone 1, i.e. at the edge of the cross section of the honeycomb body, catalyst C contained 0.832 grams of noble metal per liter of catalyst volume, 0.620 grams were present in zone 2 and 0.436 grams in zone 3, i.e. in the center of the cross section of the honeycomb body, in a ratio by weight of Pt: Rh=5:1 in all cases.

In the case of catalyst D, the noble metal was applied as in the case of catalyst C.

In the last production step, the four catalysts A, B, C and D were reduced for 8 hours at 550° C. in a stream of hydrogen.

Figure 2:
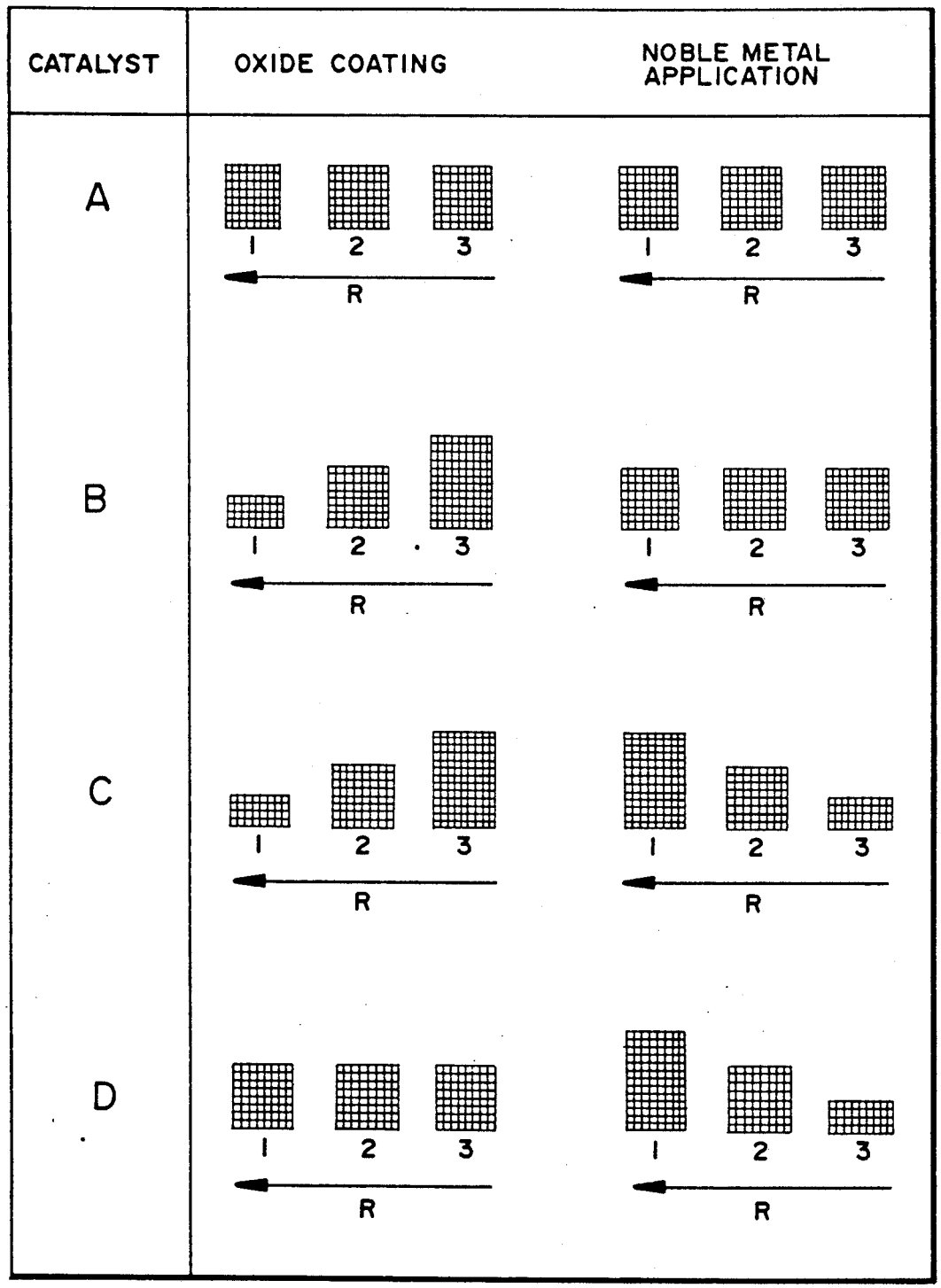
FIG. 2 is a chart showing distribution of materials over the cross-section of the honeycomb body.

The distribution of amount of washcoat and noble metal over the cross section of the honeycomb body is shown in FIG. 2 for the four catalysts A, B, C and D (R=distance between central axis and periphery (tip of arrow) and 1, 2 and 3 denote the zones).

EXAMPLE 2

The four catalysts A, B, C and D of Example 1 were tested on an engine test-bed both when fresh and after engine ageing for 20 hours, the temperature of the exhaust gases during the ageing reaching 1000° C. at the inlet of the catalyst.

A 1.8 liter spark-ignition engine was used for checking the catalyst performance and for the engine ageing. All the tests were run with lead-free super gasoline; that is, with an octane number of approximately 96.

The catalyst performance was checked on the basis of two tests.

In the first test, the start-up behavior of the catalyst was checked, i.e. the temperature was determined at which 50% of the hydrocarbons, of the carbon monoxide and of the nitrogen oxides were converted. This occurred at lambda=1.02 for carbon monoxide and hydrocarbons and at lambda=0.9840 for the nitrogen oxides. The space velocity in this test was 60,000 standard liters of exhaust gas per liter of catalyst volume and hour.

In the second test, the conversion of carbon monoxide, hydrocarbons and nitrogen oxides was determined as a function of lambda value at an exhaust gas temperature of 400° C. upstream of the catalyst and a space velocity of 60,000 standard liters of exhaust gas per liter of catalyst volume and hour. The lambda value is defined as is known in the art by the relationship between the amount of air introduced into the motor and the calculated amount of air necessary for the complete oxidation of the fuel introduced into the motor. A standard liter is a liter at room temperature and atmospheric pressure.

The start-up behavior of the fresh catalysts A, B, C and D is shown in Table 1.

From the results it follows that the start-up temperature can be reduced by approximately 10° C. for carbon monoxide conversion and hydrocarbon conversion by controlled distribution of the amount of oxide coating over the cross section of the honeycomb body.

The start-up behavior of the engine-aged catalysts A, B, C and D is shown in Table 2.

From these results it can be seen still more clearly that the start-up temperature can be reduced for carbon monoxide and hydrocarbons by approximately 15° C. and for the nitrogen oxides by approximately 40° to 50° C. by a controlled positioning of the oxide coating and the noble metals over the cross section of the honeycomb bodies. Furthermore, the results show that the catalyst performs best which has more noble metal and less oxide coating at the outer edge of the cross section of the honeycomb body and more oxide coating and less noble metal in the center.

It should be noted that the present invention is applicable to a wide variety of catalytically active noble metals as the catalyst. Also, the usual and customary catalytic supports and carriers can be used for purposes of this invention.

Further variations and modifications will be apparent to those skilled in the art from the foregoing and are intended to be encompassed by the claims appended hereto.

German priority application P 39 12 915.2 is relied on and incorporated by reference.

TABLE 1

| | Temperature for 50% conversion (fresh catalysts) | | |
|---|---|---|---|
| | Lambda = 1.02 | | Lambda = 0.984 |
| Catalyst | CO$_{50\%}$ (°C.) | HC$_{50\%}$ (°C.) | NO$_x$ $_{50\%}$ (°C.) |
| A (Comparison) | 312 | 313 | 328 |
| B | 295 | 296 | 310 |
| C | 299 | 301 | 328 |
| D | 306 | 306 | 337 |

TABLE 2

| | Temperature for 50 conversion (aged catalysts) | | |
|---|---|---|---|
| | Lambda = 1.02 | | Lambda = 0.984 |
| Catalyst | CO$_{50\%}$ (°C.) | HC$_{50\%}$ (°C.) | NO$_x$ $_{50\%}$ (°C.) |
| A (Comparison) | 336 | 340 | 388 |
| B | 330 | 333 | 345 |
| C | 320 | 327 | 334 |
| D | 326 | 331 | 347 |

We claim:

1. A monolithic or honeycomb-type catalyst, in particular for purifying the exhaust gases of internal-combustion engines, composed of an inert ceramic or metallic support traversed by parallel flow channels, a layer disposed thereon and composed of catalysis-promoting layer of metal oxide and a catalytically active component supported by the metal oxide, wherein the concentration of the catalysis-promoting metal oxide increases from the periphery to the central axis of the support.

2. A catalyst as claimed in claim 1, wherein the concentration of the catalytically active component increases from the central axis to the periphery of the support.

3. A monolithic or honeycomb-type catalyst, in particular for purifying the exhaust gases of internal-combustion engines, composed of an inert ceramic or metallic support traversed by parallel flow channels, a layer disposed thereon and composed of catalysis-promoting metal oxide and a catalytically active component supported by the metal oxide, wherein the catalysis-promoting metal oxide is essentially equally distributed between central axis and a periphery of the support, but concentration of catalytically active component increases from the central axis to the periphery of the support.

* * * * *